(12) United States Patent
Derclaye et al.

(10) Patent No.: US 11,040,506 B2
(45) Date of Patent: Jun. 22, 2021

(54) METHOD FOR MANUFACTURING A COMPOSITE CASING FOR A TURBOMACHINE COMPRESSOR

(71) Applicant: SAFRAN AERO BOOSTERS SA, Herstal (BE)

(72) Inventors: Alain Derclaye, Couthuin (BE); Philippe Berot, Abolens (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 393 days.

(21) Appl. No.: 16/155,179

(22) Filed: Oct. 9, 2018

(65) Prior Publication Data

US 2019/0105857 A1    Apr. 11, 2019

(30) Foreign Application Priority Data

Oct. 9, 2017   (BE) .................. 2017/5722

(51) Int. Cl.
*B29C 70/84* (2006.01)
*B29C 70/38* (2006.01)
(Continued)

(52) U.S. Cl.
CPC ............ *B29C 70/84* (2013.01); *B29C 70/382* (2013.01); *B29C 70/386* (2013.01); *B29C 70/46* (2013.01); *B29C 70/462* (2013.01); *B29C 70/78* (2013.01); *F01D 25/24* (2013.01); *B29C 70/545* (2013.01); *B29C 70/682* (2013.01); *B29C 70/885* (2013.01); *B29C 2793/0045* (2013.01); *B29K 2307/04* (2013.01); *B29K 2309/08* (2013.01); *B29K 2705/00* (2013.01); *B29L 2031/3076* (2013.01); *B29L 2031/7504* (2013.01); *B32B 2262/106* (2013.01); *F05D 2220/36* (2013.01); *F05D 2230/51* (2013.01); *F05D 2300/603* (2013.01)

(58) Field of Classification Search
CPC ..... B29C 70/46; B29C 70/462; B29C 70/382; B29C 43/146; B29C 43/20; B29C 43/203; B29C 2043/412; B29C 2043/416
USPC .................................................. 425/412, 416
See application file for complete search history.

(56) References Cited

U.S. PATENT DOCUMENTS

| 4,574,029 A | 3/1986 | Murray |
| 2006/0118999 A1* | 6/2006 | Cooper ............... B29C 45/1628 264/255 |

(Continued)

FOREIGN PATENT DOCUMENTS

EP    2845707 A1    3/2015

OTHER PUBLICATIONS

Search Report dated Jul. 10, 2018 for BE 201705722.

*Primary Examiner* — Timothy Kennedy
(74) *Attorney, Agent, or Firm* — James E. Walton (57) ABSTRACT

A method for manufacturing a curved composite casing for a turbomachine, notably for a low-pressure compressor of an aircraft turbojet engine, includes the following sequence of steps: (a) draping a preform by automatic placement of carbon fibres on a concave form, referred to as a female form; (b) laying a glass-fibre ply on a convex form, referred to as a male form; (c) transferring the preform onto the convex form, covering the glass-fibre ply on the convex form. Step (b) laying includes a phase (α) of laying a metal strip and/or an epoxy profile on the convex form, then a phase (β) of covering the metal strip with the glass-fibre ply.

19 Claims, 5 Drawing Sheets

(51) Int. Cl.
    *F01D 25/24*     (2006.01)
    *B29C 70/78*     (2006.01)
    *B29C 70/46*     (2006.01)
    *B29C 70/68*     (2006.01)
    *B29K 309/08*     (2006.01)
    *B29K 307/04*     (2006.01)
    *B29L 31/00*     (2006.01)
    *B29K 705/00*     (2006.01)
    *B29L 31/30*     (2006.01)
    *B29C 70/54*     (2006.01)
    *B29C 70/88*     (2006.01)

(56) References Cited

U.S. PATENT DOCUMENTS

2014/0086734 A1     3/2014   Xie
2016/0361837 A1*  12/2016  Hayes .................. B29C 43/183

\* cited by examiner

METHOD FOR MANUFACTURING A COMPOSITE CASING FOR A TURBOMACHINE COMPRESSOR

This application claims priority under 35 U.S.C. § 119 to Belgium Patent Application No. 2017/5722, filed 9 Oct. 2017, titled "Method for Manufacturing a Composite Casing for a Turbomachine Compressor," which is incorporated herein by reference for all purposes.

BACKGROUND

1. Field of the Application

The present application relates to the manufacture of a composite casing by automatic fibre placement, the casing being a turbomachine casing or, more specifically, a casing for a compressor of a turbomachine such as a turbojet engine.

2. Description of Related Art

Creating a composite casing for a turbomachine entails precise placement of the fibres so as to result in a predetermined distribution of the reinforcement. Specifically, the orientation of the fibres allows the casing to withstand stresses in given directions and according to given modes. The precision with which the fibres are placed can be optimized by using an automated robot. Its application head scrupulously arranges the fibres according to a model calculated using software.

Document US 2014/0086734 A1 discloses a method for creating a composite casing for a turbomachine. The method consists in producing a 360° sheet using the AFP technique, in laying several segments against the 360° sheet, then in solidifying the 360° sheet and the segments together. However, the geometric constraints on this method remain high. The number of component parts needs to be limited in order for the draping operation to remain simple. Furthermore, the precision with which the fibres are positioned remains limited.

Although great strides have been made in the area of composite casings for turbomachine compressors, many shortcomings remain.

DETAILED DESCRIPTION OF THE PREFERRED EMBODIMENT

It is an objective of the present application to solve at least one of the problems presented by the prior art. More specifically, the present application seeks to improve the precision with which the fibres of a composite casing are placed. Another objective of the present application is to propose a solution which is simple, lightweight, economical, reliable, easy to produce and easy to inspect.

One subject of the present application is a method for manufacturing a curved composite casing for a turbomachine, notably an aircraft turbojet engine, the method comprising the following steps: (a) draping a preform by automatic placement of carbon fibres on a concave form; (b) laying a glass-fibre ply on a convex form; (c) transferring the preform onto the convex form, covering the glass-fibre ply on the convex form.

According to advantageous embodiments of the present application, the method may comprise one or more of the following features, considered in isolation or in any technically feasible combination:

Step (b) laying comprises a phase ($\alpha$) of laying a metal strip and/or an epoxy profile on the convex form then a phase ($\beta$) of covering the metal strip with the glass-fibre ply.

The method further comprises a step (e) of curing a stack made up of the glass-fibre ply and the preform, so as to form a raw casing.

The convex form is a convex mould part, step (e) curing being performed on the convex mould part, notably in combination with a concave counter-mould arranged around the preform.

The method further comprises a step (f) of machining the casing, notably the composite component resulting from step (e) curing.

Step (f) machining comprises the drilling of orifices passing through the casing, the said drillings describing at least one curved row, possibly as many as six curved rows, which are notably able to accept flow-straightening vanes.

The method further comprises a step (d) of taping the preform to the glass-fibre ply, and/or of taping a membrane against the preform.

The casing is formed of half-shells; the method further comprises a step (g) of assembling two half-shells, the casing having an inside diameter comprised between 0.40 m and 3.00 m.

The method further comprises a step (h) of thermally spraying an abradable material inside the casing.

At the end of step (a) draping, the preform has at least one flange extending radially against the concave form and/or against the convex form.

The at least one flange comprises an axial flange and/or a curved flange that is curved about an axis of rotation of the turbomachine; at the end of step (a) draping, the axial flange and the curved flange extend from one and the same corner, the said corner having a clearance separating the said flanges, at least over part of their radial heights.

During step (a) draping, the automatically placed fibres comprise a two-dimensional woven tape or a tape of unidirectional fibres, the fibres potentially being preimpregnated fibres or dry fibres.

During step (a) draping, the automatically placed fibres comprise a two-dimensional woven braid and/or a three-dimensional woven braid, the fibres potentially being dry fibres.

During step (a) draping, the automatically placed fibres comprise a flat band, notably of dry fibres.

At the end of step (a) draping, the preform exhibits at least ten strata, potentially at least fifteen strata, each one formed by at least one fibre ply or a tape of parallel fibres.

The casing has two opposite ends, potentially diametrically or axially opposite, the casing having a wall of constant thickness extending as far as each of the said opposite ends.

In step (e) curing, a thermosetting resin or a thermoplastic resin impregnates the glass-fibre ply and the preform.

Before step (e) curing a resin infuses and/or is injected into the fibres of the glass-fibre ply and of the preform.

The convex form comprises a convex receiving surface; at the end of step (c) transferring, the preform and the glass-fibre ply each cover the entire receiving surface.

The method further comprises a step (i) of mounting stator blades inside the casing so as to form from one to six flow straighteners, potentially from three to four flow straighteners.

At the end of step (a) draping, the preform has two opposite ends, potentially diametrically or axially opposite, the preform having a wall of constant thickness extending from each of the said opposite ends.

At the end of step (c) transferring, the preform extends over the entire axial length of the glass-fibre ply.

During step (a) draping, the automatically placed fibres comprise dry fibres or preimpregnated fibres.

At least one or each ply is made from a nonwoven or a woven.

In step (e) curing, the thermosetting resin or the thermoplastic resin polymerizes.

At the end of phase (β) covering, the glass-fibre ply is interposed between the metal strip and the carbon fibres so as to electrically insulate the carbon fibres from the metal strip.

At the end of step (f) machining, the preform has an axial flange and an annular flange extending from one and the same corner, the said corner having a clearance separating the said flanges, at least over part of their radial heights.

The point has three facets and/or three edge corners.

Another subject of the present application is a method for manufacturing a curved composite casing for a turbomachine, the method comprising the following steps: (a) draping a preform by automatic placement of carbon fibres on a concave form (α) laying a metal strip and/or an epoxy profile on a convex form; (β) covering the strip and/or the profile with a glass-fibre ply likewise covering the convex form; (c) transferring the preform onto the convex form, covering the glass-fibre ply on the convex form.

In general, the advantageous embodiments of each subject matter of the present application also apply to the other subjects of the present application. Each subject matter of the present application can be combined with the other subjects, and the subjects of the present application can also be combined with the embodiments in the description which, furthermore, can be combined with one another, in any technically feasible combination, unless the contrary is explicitly stated.

The present application makes it possible to preserve the precision of the orientation of the fibres despite an increasing number of component parts, notably of component parts of different kinds. Furthermore, the draped preform maintains its layup precision despite the presence of inserts, and despite the fact that it is handled prior to polymerization. Specifically, the carbon fibres are used on a first form and the glass fibres, which are therefore fibres of a different nature, are placed on a second form.

The casing is able to withstand the finishing steps such as machining because the fibres conform to precise locations in relation to the zones that are cut. Thus, the casing is suited to an increasing number of mechanical interfaces.

In the description which will follow, the terms "internal" and "external" refer to positioning with respect to the axis of rotation of an axial turbomachine. The axial direction corresponds to the direction along the axis of rotation of the turbomachine, or along the axis of revolution of the casing. The radial direction is perpendicular to the axis of rotation.

Upstream and downstream are referenced to the main direction in which the flow flows through the turbomachine.

Figure 1:
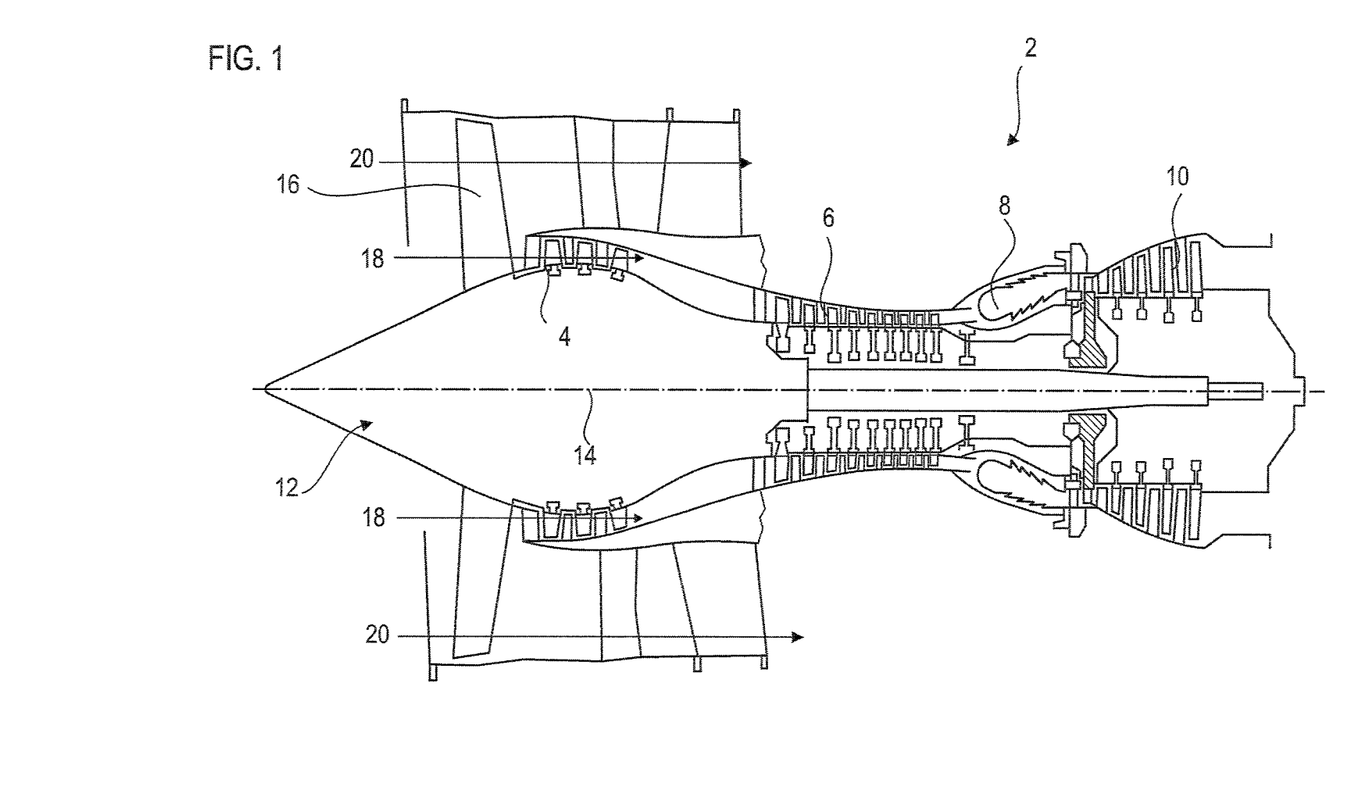
FIG. 1 depicts an axial turbomachine according to the present application.

FIG. 1 is a simplified depiction of an axial turbomachine. In this particular case it is a bypass turbojet engine. The turbojet engine 2 comprises a first compression stage, referred to as a low-pressure compressor 4, a second compression stage, referred to as a high-pressure compressor 6, a combustion chamber 8 and one or more turbine stages 10. In operation, the mechanical power of the turbine 10 transmitted via the central shaft to the rotor 12 drives the two compressors 4 and 6. These comprise several rows of rotor blades associated with rows of stator blades. Rotation of the rotor about its axis of rotation 14 thus makes it possible to generate an air flow and to compress same progressively as far as the inlet to the combustion chamber 8.

An inlet blower commonly referred to as a fan 16 is coupled to the rotor 12 and generates an air flow which splits into a primary flow 18 that passes through the various aforementioned turbomachine stages and a secondary or bypass flow 20 that passes through an annular duct (depicted in part) along the machine to then recombine with the primary flow at the turbine outlet.

The secondary or bypass flow can be accelerated so that it generates jet thrust required for the flight of an aeroplane. The primary flow 18 and secondary or bypass flow 20 are coaxial annular flows one inside the other. They are ducted by the turbomachine casing and/or shrouds.

Figure 2:
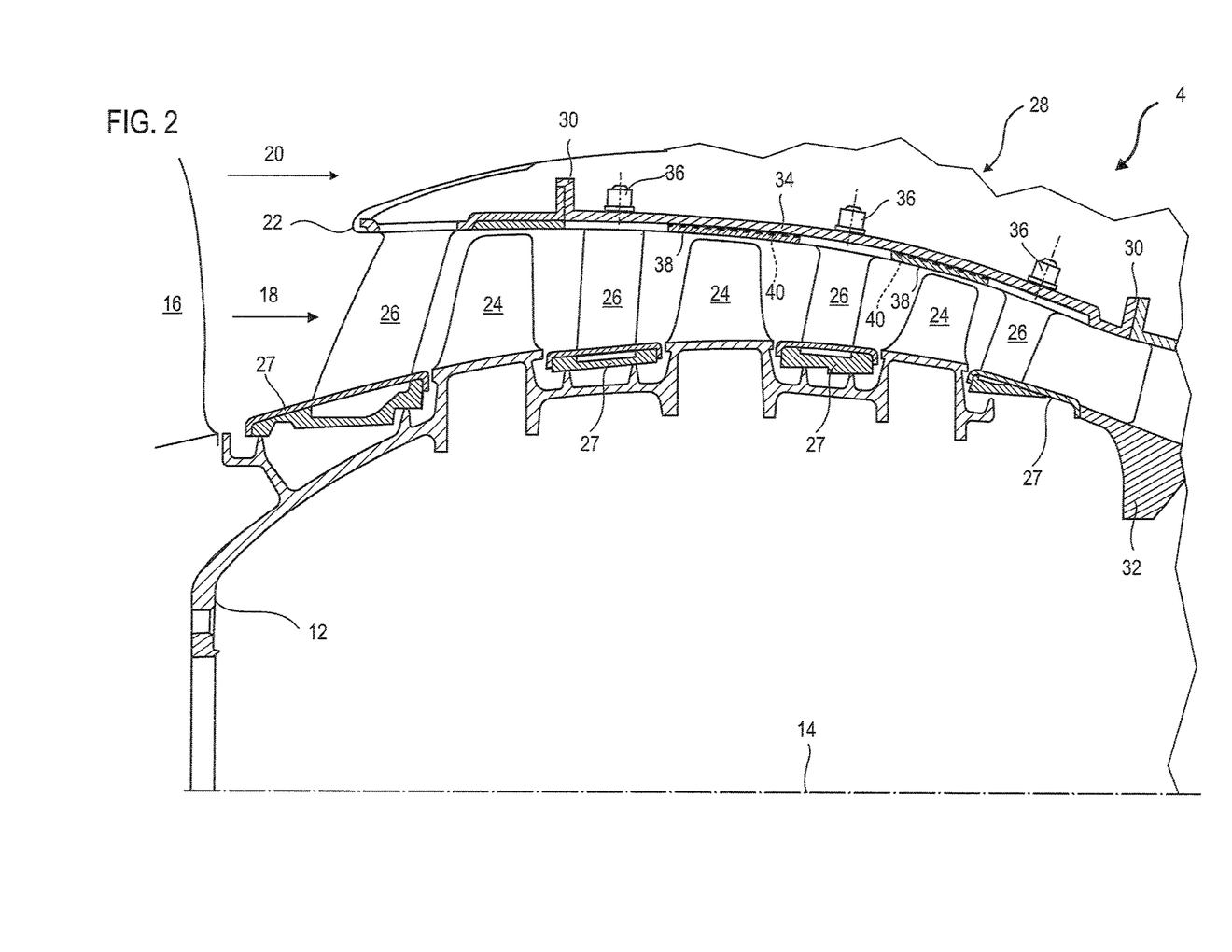
FIG. 2 is a diagram of a turbomachine compressor according to the present application.

FIG. 2 is a view in cross section of a compressor of an axial turbomachine such as that of FIG. 1. The compressor may be a low-pressure compressor 4. Here may be seen part of the fan 16 and the splitter 22 that divides the primary flow 18 from the secondary or bypass flow 20. The rotor 12 comprises several rows of rotor blades 24, in this case three rows. It may be formed of a drum just as it may be formed using one-piece discs.

The low-pressure compressor 4 comprises several flow straighteners, in this instance four, each containing an annular row of stator vanes 26. The flow straighteners are associated with the fan 16 or with a row of rotor blades to straighten the flow of air so that the velocity of the flow can be converted into a pressure, notably a static pressure.

Internal shrouds 27 may be suspended from the internal ends of the stator blades 26. These internal shrouds 27 may receive layers of abradable material 38 to ensure sealing against the rotor 12.

The compressor 4 comprises at least one composite casing 28. The casing 28 may be of circular or tubular overall shape. In operation it is exposed to temperatures from −70° C. to 150° C. It may be a compressor external casing and may be made of organic matrix composite material.

The casing 28 may comprise fixing flanges 30, for example annular fixing flanges 30 for attaching the splitter 22 and/or for fixing to an intermediate turbomachine fan casing 32. The stator vanes 26 extend essentially radially from the exterior casing 28. The stator vanes 26 may comprise platforms and/or fixing pins 36.

The composite casing 28 may comprise a wall 34 which is generally circular or an arc of a circle, the edges of which may be delimited by the flanges 30. The wall 34 may have a profile of revolution about the axis of rotation 14. It may be made of composite material, with a matrix and fibre reinforcers. Its shape may be that of a ogive or spheroid, with a variation in radius along the axis 14.

The wall 34 may comprise annular layers of abradable material 38 between the platforms of the vanes 26, so as to form seals against recirculation. One or more strips 40 may be incorporated. Each abradable layer 38 may be associated with a strip 40. Each strip 40 may form a metal tape, possibly perforated. It may form the attachment interface between the wall 34 and the abradable layer 38.

Figure 3:
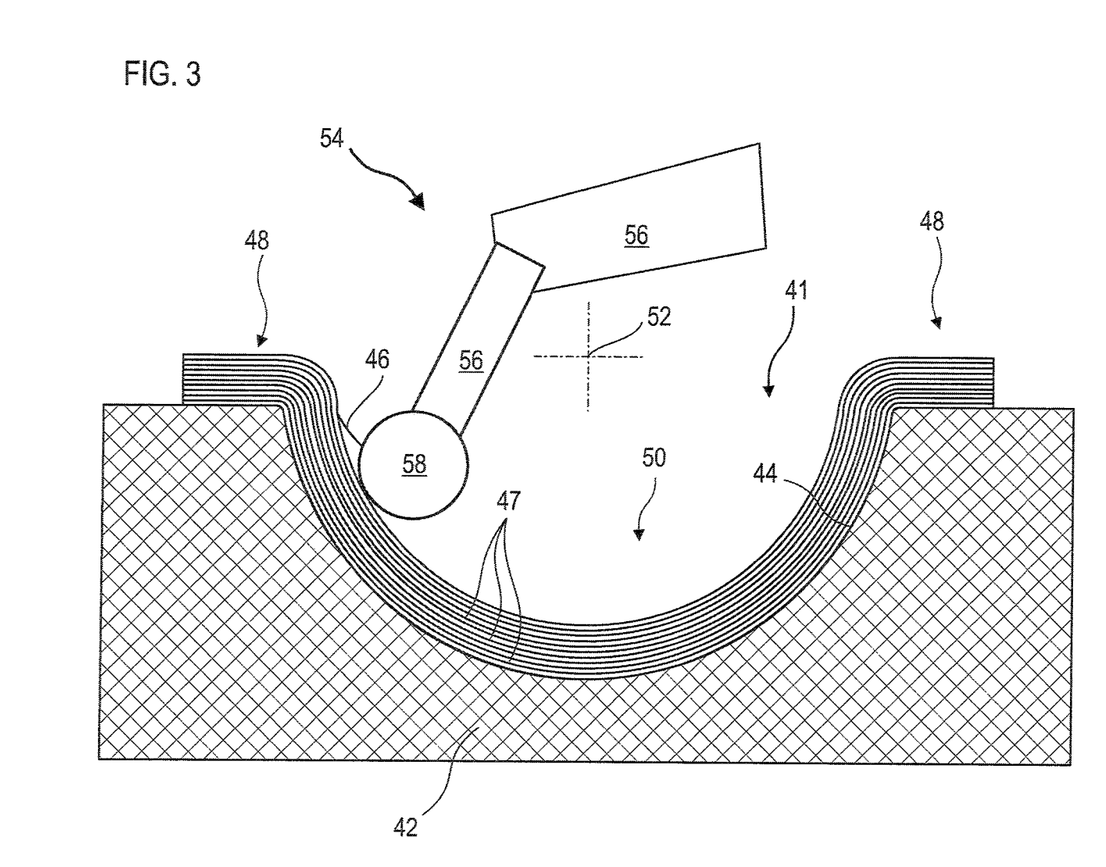
FIG. 3 depicts a step of draping a preform according to the present application.

FIG. 3 illustrates a step of draping a preform 41 through the automatic placement of carbon fibres on a concave form 42, also referred to as a female form. The form 42 is shown in section perpendicular to the axial direction and/or to the axis 52.

The concave form 42 comprises a concave draping surface 44 on which the fibres, notably carbon fibres, are placed. The fibres 46 can be placed in the form of tapes and/or of plies to form several layers 47. The tapes may be placed parallel to one another and transversely touching so as to form a layer 47. Thus, the fibre preform 41 may exhibit a stack of layers 47 or strata. The layers 47 are superposed radially.

The draping surface 44 may comprise lateral zones 48 that make it possible to create the axial flanges 48 of the casing. It may comprise a curved portion 50, which may potentially be tubular or ellipsoidal. It may make it possible to create the wall of the composite casing as shown in connection with FIG. 2. The concave surface 44 is adapted accordingly, notably to take account of the final thickness of the wall. The curved portion 50 may have an axis of revolution 52, or axis of symmetry. This axis 52 may correspond to the axis of rotation of the compressor.

The draping can be performed automatically using a robot 54. This robot 54 may perform the draping operation according to the technique whereby the fibres 46 are placed automatically, better known by the acronym APF which stands for "Automated Fibre Placement". Laying several fibre tapes on the one same surface makes it possible to create a fibrous layer 47.

The robot 54 may comprise one or more mobile arms 56 allowing an application head 58 to be moved. The application head 58 covers the concave surface 44 where it places the fibres 46 in preestablished directions, so as to tend towards the preform 41 mentioned hereinabove.

Figure 4:
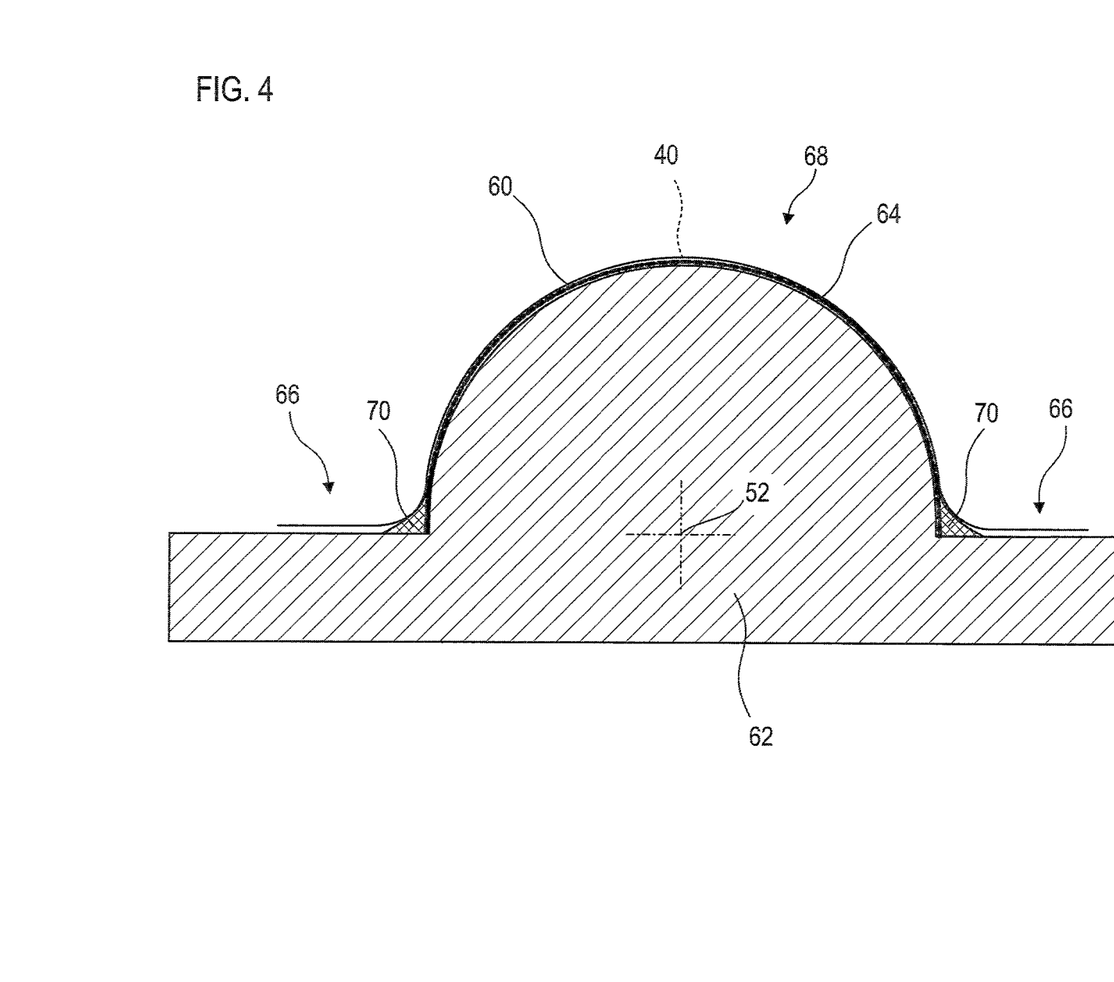
FIG. 4 illustrates a step of laying a glass-fibre ply according to the present application.

FIG. 4 shows a step of laying a glass-fibre ply 60 on a convex form 62 also referred to as a male form. The convex form 62 comprises an essentially convex receiving surface 64 of a shape that complements the internal surface of the casing that is to be produced. The convex form 62 is depicted in section perpendicular to the axis of revolution 52.

The convex form 62 may have lateral zones 66 allowing the creation of flanges, notably axial flanges. Like with the concave form, shapes for annular or semicircular flanges (not depicted) may be provided. Furthermore, the receiving surface 64 may have a central zone 68 that makes it possible to create the wall between the flanges.

The strips 40 may be laid between the ply 60 and the form 62. It may be held there temporarily. Profiles 70, for example made of reinforced polymers, may fill the voids between the roundings of the glass-fibre ply 60 and the corners formed by the receiving surface 64. The profiles make it possible to achieve sharp edge corners at the axial and annular flanges.

Figure 5:
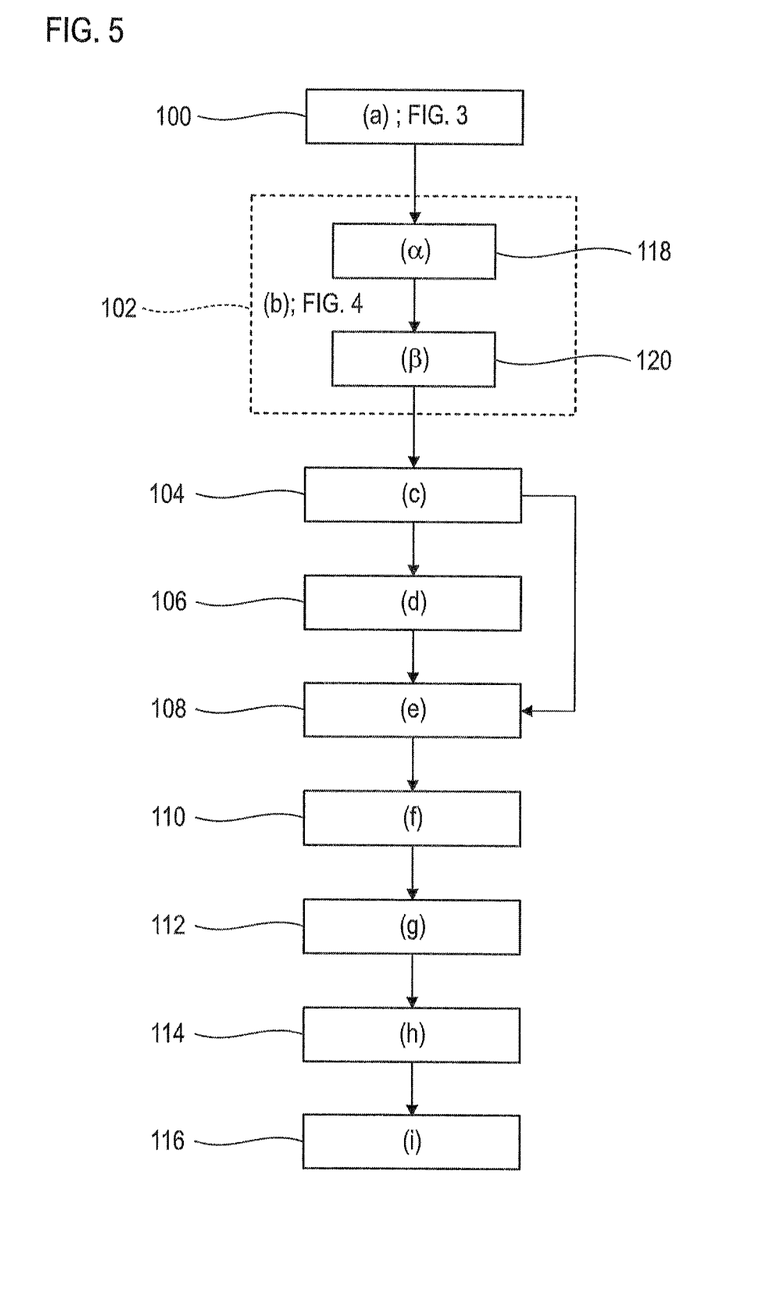
FIG. 5 illustrates a diagram of the method for manufacturing a composite casing according to the present application.

FIG. 5 shows a diagram of the method for manufacturing the casing. The casing manufactured may correspond to those mentioned in connection with FIGS. 1 to 4.

The method may comprise the following steps, notably performed in the order given hereinbelow:

(a) Draping 100 a preform by automatic placement of carbon fibres on a concave female form.

(b) Laying 102 a glass-fibre ply on a convex male form.

(c) Transferring 104 the preform onto the convex form, covering the glass-fibre ply on the convex form.

(d) Taping 106 the preform to the glass-fibre ply, and/or of taping a membrane against the preform comprising the carbon fibres.

(e) Curing 108 a stack made up of the glass-fibre ply and the preform, so as to form a raw casing by polymerizing the resin mixed with the fibres.

(f) Machining 110 of the raw casing resulting from the moulding after curing, which means to say machining of the preform solidified by the converted resin.

(g) Assembling 112 of two mould half-shells when the casing is produced as half-shells.

(h) Thermal spraying 114, for example plasma spraying, of an abradable material into the casing so as to form annular seals.

(i) Mounting 116 stator blades inside the casing so as to form from one to six flow straighteners, potentially from three to four flow straighteners.

The blades, notably the blade platforms, may come into contact with the glass-fibre ply and may be electrically insulated from the carbon fibres. The platform/glass-fibre contact dictates the orientation of the vanes.

When the casing is produced in the form of half-shells, or in the form of angular segments more generally, the half-shells or the angular segments may be separated from one another in order to facilitate assembly of internal shrouds and the mounting of the casing around the rotor, for example when the latter is of the one-piece drum type.

At the end of step (a) draping 100, which step is notably illustrated in FIG. 3, the preform may exhibit at least one or at least two annular flanges extending radially against the concave form. These flanges may be formed at the axial ends of the preform. They may include an axial flange and/or a flange which is curved about an axis of rotation of the turbomachine; at the end of step (a) draping 100, the axial flange and the curved flange may extend from the one same corner forming a point. The corner may correspond to a corner of a half-shell. The corner may exhibit a clearance separating said flanges. This corner may result from the draping of the fibres.

During step (a) draping 100, the fibres may be placed in the form of a two-dimensional woven tape or of a tape of unidirectional fibres. These fibres may then be preimpregnated fibres or dry fibres.

As an alternative or in addition, during step (a) draping 100, the automatically placed fibres may be supplied in the form of a woven braid. This braid may be a two-dimensional woven braid or a three-dimensional woven braid. Once again, the fibres may be dry fibres, or alternatively may be preimpregnated fibres.

At the end of step (a) draping 100, the preform exhibits at least ten strata of carbon fibres, potentially at least fifteen strata of carbon fibres, each one formed of at least one fibre ply. Each stratum may comprise and/or be formed of identical plies, and potentially arranged with the same orientation of fibres.

Step (b) laying 102 is notably illustrated in FIG. 4. Step (b) laying 102 may comprise an intermediate phase (α) laying 118 a metal strip and/or an epoxy profile on the convex form, and then an intermediate phase (β) covering 120 the metal strip and/or the profile with the glass-fibre ply.

At the end of step (c) transferring, the preform and the glass-fibre ply each cover the entire draping surface.

The convex form may be a convex mould part. In step (e) curing 108, the convex form may be used directly as a mould in which to solidify the preform by heating so that it becomes the desired composite casing. A concave counter-mould placed around the preform may be brought against the preform in order to close the mould. Thus, a moulding chamber, notably a resin-injection chamber, can be delimited.

Step (f) machining 110 may involve cutting the edges of the flanges so that their edges are clean-cut. Step (f) machining 110 can be performed using milling. It may include the creation of drillings to form the blade fixing orifices. The orifices may accept blade fixing pins. The drillings may describe three or four annular rows for the stator vanes of the flow. straighteners. Other rows of orifices may be produced in the fixing flanges.

In step (e) curing 108, a thermosetting resin or thermoplastic resin impregnates the glass-fibre ply and the preform. This may be an epoxy resin, or notably a PEI resin. This resin may be injected into the mould using a pump.

We claim:

1. Method for manufacturing a curved composite casing for an aircraft turbine engine, the method comprising:
   (a) draping a preform by automatic placement of carbon fibres on a concave form;
   (b) laying a glass-fibre ply on a convex form; and
   (c) transferring the preform onto the convex form, covering the glass-fibre ply on the convex form.

2. Method according to claim 1, wherein the step (b) laying a glass-fibre ply comprises:
   a phase (α) of laying a metal strip and/or an epoxy profile on the convex form; and
   a phase (β) of covering the metal strip and/or the epoxy profile with the glass-fibre ply.

3. Method according to claim 1, further comprising, after the step (c) transferring:
   a step of curing a stack made up of the glass-fibre ply and the preform, so as to form a raw casing.

4. Method according to claim 3, wherein the convex form is a convex mould part, and wherein the step curing is performed on the convex mould part in combination with a concave counter-mould arranged around the preform.

5. Method according to claim 3, wherein in the step curing, a thermosetting resin or a thermoplastic resin impregnates the glass-fibre ply and the preform.

6. Method according to claim 3, wherein before the step curing, a resin infuses and/or is injected into the fibres of the glass-fibre ply and into the carbon fibres of the preform.

7. Method according to claim 3, further comprising, after the step curing:
   a step of machining of the composite casing resulting from the step curing.

8. Method according to claim 7, wherein the step machining comprises:
   drilling of orifices passing through the casing, the said drillings describing at least six curved rows configured to accept flow-straightening vanes.

9. Method according to claim 1, further comprising, after the step (c) transferring:
   a step of taping the preform to the glass-fibre ply, and/or a step of taping a membrane against the preform.

10. Method according to claim 1, wherein the casing is formed of half-shells, the method further comprising:
    a step of assembling the said two half-shells, the casing having an inside diameter comprised between 0.40 m and 3.00 m.

11. Method according to claim 1, further comprising:
    a step of thermally spraying an abradable material inside the casing.

12. Method according to claim 1, wherein at the end of the step (a) draping, the preform has at least one flange extending radially against the concave form.

13. Method according to claim 1, wherein during the step (a) draping, the automatically placed fibres comprise:
    a two-dimensional woven tape or a tape of unidirectional fibres, the fibres being preimpregnated fibres or dry fibres.

14. Method according to claim 1, wherein during the step (a) draping, the automatically placed fibres comprise:
    a two-dimensional woven braid and/or a three-dimensional woven braid, the fibres being dry fibres.

15. Method according to claim 1, wherein during the step (a) draping, the automatically placed fibres comprise:
    a flat band of dry fibres.

16. Method according to claim 1, wherein at the end of the step (a) draping, the preform exhibits at least ten strata, each one formed by at least one fibre ply or a tape of parallel fibres.

17. Method according to claim 1, wherein the casing has two opposite ends, the casing having a wall of constant thickness extending as far as each of the said opposite ends.

18. Method according to claim 1, wherein the convex form comprises:
    a convex receiving surface, and wherein at the end of the step (c) transferring, the preform and the glass-fibre ply each cover the entire convex receiving surface.

19. Method according to claim 1, further comprising:
    a step of mounting stator blades inside the casing so as to form at least three flow straighteners.

* * * * *